US007851227B2

(12) United States Patent
Barlag et al.

(10) Patent No.: US 7,851,227 B2
(45) Date of Patent: Dec. 14, 2010

(54) METHOD FOR CARRYING OUT AN ELECTROCHEMICAL MEASUREMENT ON A LIQUID MEASURING SAMPLE IN A MEASURING CHAMBER THAT CAN BE ACCESSED BY LINES, AND CORRESPONDING ARRANGEMENT

(75) Inventors: Heike Barlag, Nuremberg (DE); Siegfried Birkle, Höchstadt (DE); Walter Gumbrecht, Herzogenaurach (DE); Daniela Kühn, Hemhofen (DE); Peter Paulicka, Erlangen (DE); Manfred Stanzel, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 456 days.

(21) Appl. No.: 11/665,331

(22) PCT Filed: Oct. 17, 2005

(86) PCT No.: PCT/EP2005/011156

§ 371 (c)(1), (2), (4) Date: May 23, 2008

(87) PCT Pub. No.: WO2006/042734

PCT Pub. Date: Apr. 27, 2006

(65) Prior Publication Data

US 2009/0136922 A1 May 28, 2009

(30) Foreign Application Priority Data

Oct. 15, 2004 (DE) ...................... 10 2004 050 576

(51) Int. Cl.
*G01N 1/10* (2006.01)
*G01N 35/00* (2006.01)

(52) U.S. Cl. ........................ 436/180; 422/68.1; 422/81; 422/82.01; 422/100; 422/102; 422/103; 436/43; 436/174

(58) Field of Classification Search .................. 422/81, 422/82.01, 100, 102, 103; 436/174, 180
See application file for complete search history.

(56) References Cited

U.S. PATENT DOCUMENTS

| | | | | |
|---|---|---|---|---|
| 4,486,097 | A * | 12/1984 | Riley | 356/410 |
| 4,963,498 | A | 10/1990 | Hillman et al. | |
| 5,482,862 | A * | 1/1996 | LaPack et al. | 436/52 |
| 5,695,720 | A * | 12/1997 | Wade et al. | 422/82 |

FOREIGN PATENT DOCUMENTS

| | | |
|---|---|---|
| WO | WO 02/072262 | 9/2002 |
| WO | WO 02/073153 | 9/2002 |
| WO | WO 03/015919 A | 2/2003 |

* cited by examiner

*Primary Examiner*—Brian J Sines
(74) *Attorney, Agent, or Firm*—Harness, Dickey & Pierce, P.L.C.

(57) ABSTRACT

Especially in order to carry out the so-called enzyme-coupled DNA hybridization test in a closed cartridge including a microfluid system, using stored dry reagents, the reagents must be dissolved in the microfluid system and transported into the measuring chamber directly before the measurement. During the dissolution of the reagents in water, air cushions that cannot reach the measuring chamber must absolutely be prevented from forming upstream of the reagent liquid. According to an embodiment of the invention, the liquid measuring sample and the liquid reagents are transported in such a way that the air cushion is directed into the waste line and the measuring sample and the reagents are then introduced into the measuring chamber without any air bubbles. In this way, measuring errors can be avoided.

15 Claims, 3 Drawing Sheets

METHOD FOR CARRYING OUT AN ELECTROCHEMICAL MEASUREMENT ON A LIQUID MEASURING SAMPLE IN A MEASURING CHAMBER THAT CAN BE ACCESSED BY LINES, AND CORRESPONDING ARRANGEMENT

PRIORITY STATEMENT

This application is the national phase under 35 U.S.C. §371 of PCT International Application No. PCT/EP2005/011156 which, has an International filing date of Oct. 17, 2005, which designated the United States of America and which claims priority on German Patent Application number 10 2004 050 576.4 filed Oct. 15, 2004, the entire contents of which are hereby incorporated herein by reference.

FIELD

Embodiments of the invention generally relate to a method for carrying out an electrochemical measurement on a liquid measuring sample in a measuring chamber accessible via lines, at least one reagent in liquid form being supplied for the electrochemical measurement. Embodiments of the invention furthermore generally relate to an associated arrangement for carrying out the method, and/or to the use of this arrangement.

BACKGROUND

For nucleic acid analysis e.g. for the analysis of white blood cells from whole blood, for the purpose of answering human genomic questions, the cells must first be disintegrated in a first station as a sample preparation step and the DNA thereby released must subsequently be isolated. In a second station, a PCR (Polymerase Chain Reaction) is carried out for selective DNA amplification, in order to increase the concentration of the DNA to be detected so that it can be detected in a third station.

In the laboratory, the latter sub-processes are carried out separately according to known prior art. The aforementioned three stations each involve a plurality of working steps and are carried out separately from one another with different devices. The individual working steps are substantially carried out manually.

Conduct of the latter method is contingent on the provision of laboratory devices—such as cell disintegrating apparatus, a PCR device (a so-called thermocycler), optionally a PCR device which is suitable for quantitative PCR, electrophoretic apparatus, a hybridizing station, an optical reader, so-called Eppendorf tubes, a plurality of pipetting devices and a cooling container for reagents—and must be carried out by trained personnel while complying with safety rules governing infection risk, waste disposal, etc. In particular, a plurality of volumetric i.e. accurate dosings (pipettings) of reagent solutions have to be carried out. Such working steps are time-consuming and cost-intensive.

Instruments for biochemical analysis are known from the prior art, which according to WO 02/073153 employ in particular silicon-based measuring modules which can be integrated into a chip card. In this case, according to WO 02/072262 A1, the reagents used for the analysis are already integrated in dryly stored form into the analysis module.

SUMMARY

At least one embodiment of the invention produces a cost-efficient, easily handleable, complete DNA or protein analysis process in a miniaturized cartridge. Based thereon, it is an object of at least one embodiment of the present invention to carry out an electrochemical measurement in a measuring chamber—particularly in the case of such an assay, but not exclusively therefor—and to this end to supply the measuring sample and the liquid reagents used therefor, which are brought into the measuring chamber by pumping, free from bubbles. It is an also an object to provide an arrangement for carrying out at least one embodiment of the method.

At least one embodiment of the invention relates to a method with an associated arrangement for transferring liquids, in particular a sample liquid on the one hand and at least one reagent liquid on the other hand, into a measuring chamber for the purpose of electrochemical measurement which takes place free from bubbles for all of the liquids involved. This is important particularly when solid reagents are initially dissolved and a reagent liquid is thereby produced.

At least one embodiment of the invention makes it possible for a sample liquid and reagent liquids, which are contained in different lines that lead to the measuring chamber and are separated from one another and from the measuring chamber by air, to be brought free from air bubbles into the chamber so that the actual measurement in the measuring chamber is not perturbed.

In at least one embodiment of the invention, the measuring sample and the reagents are advantageously supplied to the measuring chamber from different sides. In each case, there are waste channels for discharging air on the different sides of the measuring chamber in the relevant arrangement.

Such an arrangement and the method according to at least one embodiment of the invention achieve discharge of air from the lines, in which the liquid substances are supplied to the measuring chamber, before the measurement. This is of practical importance particularly when dry reagents are used in a cartridge for nucleic acid diagnosis and these reagents are dissolved in water "in situ" immediately before the actual diagnosis or measuring process in order to produce a reagent liquid, and the reagent liquid is supplied to the measuring chamber. It is in fact not possible to prevent air cushions from being formed in front of the reagent liquid and the measuring liquid, which are both displaced successively by active pumping to the measuring chamber. Such air cushions, however, are undesirable in the measuring chamber since they entail the risk that the air can no longer be removed and therefore perturbs or prevents the electrochemical measurement.

At least one embodiment of the invention will thus be applied particularly in the subregion of the cartridge in which the actual detection takes place. This detection involves the enzyme-linked DNA hybridization test. The hybridization result is then marked by way of a suitable enzyme (for example streptavidin-linked alkaline phosphatase) and detected by measuring a product (for example p-aminophenol) which results from the enzymatic activity. At least one embodiment of the invention may nevertheless also be employed in other measuring processes on liquid samples, which initially need to be brought into a measuring chamber by active pumping together with reagent solutions (for example the ELISA ("Enzyme linked Immuno sorbed Assay") test).

BRIEF DESCRIPTION OF THE DRAWINGS

Further details and advantages of the invention will be found in the following description of example embodiments with the aid of the drawings in conjunction with the patent claims. Respectively in a schematic representation.

Equivalent units have the same reference numerals in the figures. In particular, FIGS. 1 to 4 will substantially be described together and FIGS. 5, 6 will substantially be described together.

DETAILED DESCRIPTION OF THE EXAMPLE EMBODIMENTS

Figure 1:
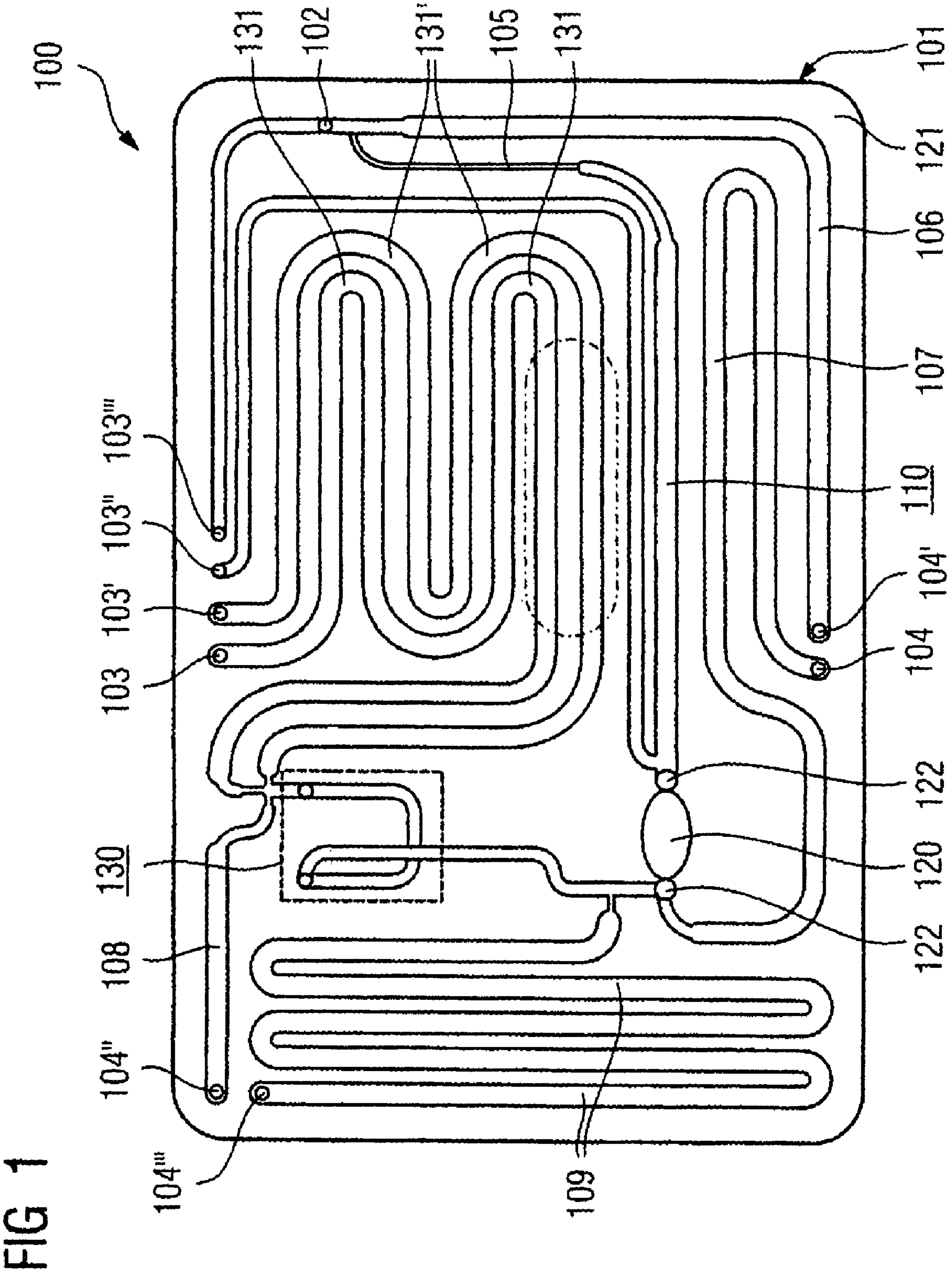
FIG. 1 shows a cartridge having a line system with the associated functional references.

FIG. 1 represents a cartridge 100 having a line system, which is formed by microchannels or cavities in a cartridge base body, and a cover film closing the latter. Specifically, the cartridge 100 includes a plastic body 101 with the microfluidic system including predetermined structures, which will be described by way of example below with the aid of FIGS. 2 to 4.

A sample port 102 with a subsequent dosing section 105 can be seen in the plan view according to FIG. 1. This is followed by a channel region 110 for the cell disintegration and subsequently a region 120 for the PCR. The actual PCR chamber can be closed by valves 122, 122'. Detection of the sample, in particular according to the enzyme-linked DNA hybridization method, then takes place in the region 130.

Water ports 103 to 103''' can furthermore be seen in FIG. 1. There are furthermore air discharge ports 104 to 104'''.

Wide regions 106, 107, 108, 109 for receiving waste are provided in the channel system. There is furthermore a region for receiving the reagents 131, 131'.

Figure 2:
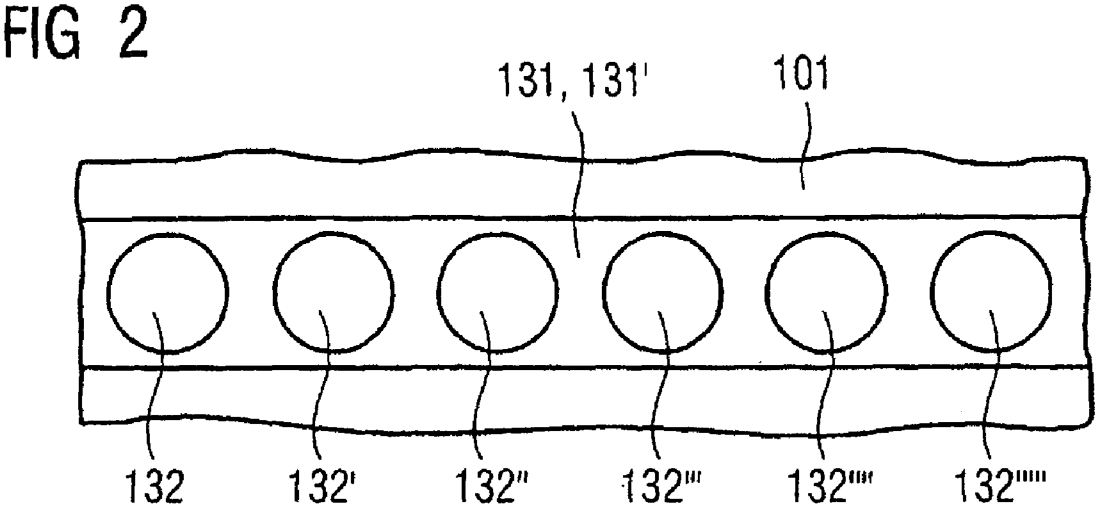
FIG. 2 shows the plan view of a line having wells for the storage of a dry reagent.
Figure 3:
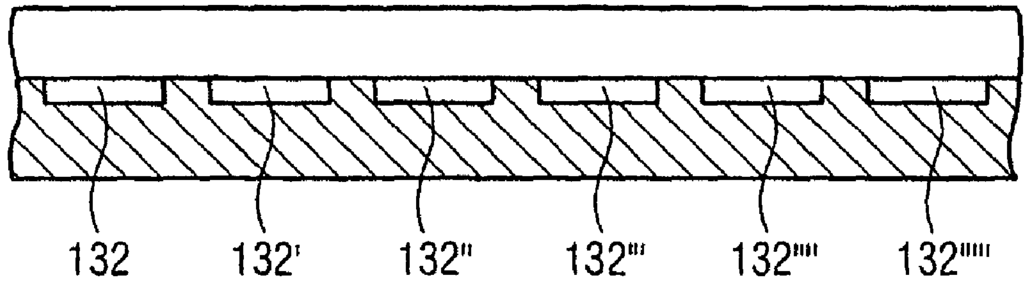
FIGS. 3, 4 show the cross section through a line having wells for the storage of a dry reagent according to FIG. 2.
Figure 4:
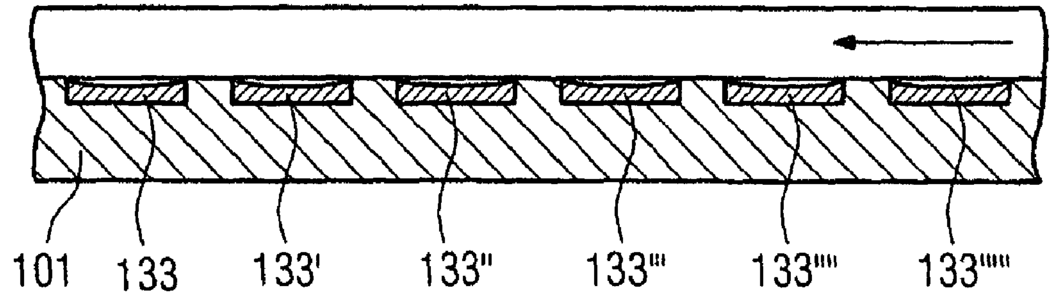

FIGS. 2 to 4 reveal the layout and the structure of the reagent channel 131, 131' in FIG. 1. Wells 132 to $\mathbf{132}^{6'}$ are respectively provided, which are suitable for receiving dry reagents 133 to $\mathbf{133}^{6'}$ according to FIG. 3. In FIG. 4, the wells 132 to $\mathbf{132}^{6'}$ are represented filled with dry reagents 133 to $\mathbf{133}^{6'}$.

Figure 5:
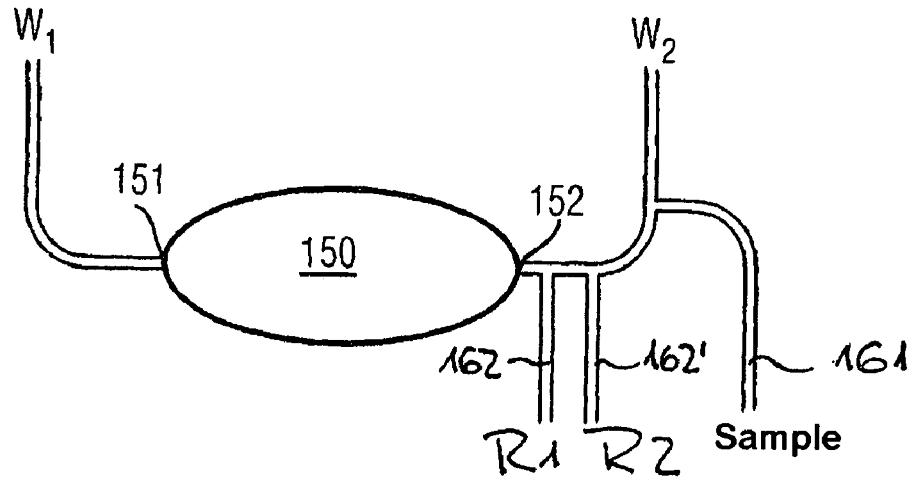
FIG. 5 shows a first arrangement, in which the lines for the reagents and the measuring sample are arranged on one side of the measuring chamber.
Figure 6:
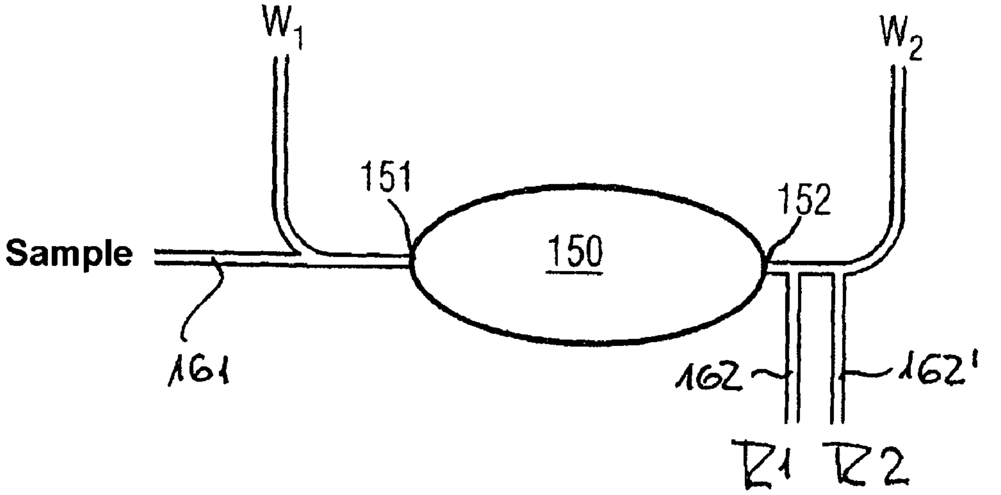
FIG. 6 shows a second arrangement, in which the lines for the reagents and the measuring sample are arranged on different sides of the measuring chamber.

In FIGS. 5 and 6, reference numeral 150 denotes a measuring chamber for carrying out an electrochemical measurement, in particular a so-called enzyme-linked DNA hybridization test. For the measurement, a hybridized measuring sample on the one hand and particular reagents on the other hand must be introduced into the measuring chamber. The actual measuring device(s) and the device(s) for electrical signal acquisition are not represented in FIGS. 5 and 6.

The measuring chamber is represented as an oval cavity 150 in FIGS. 5 and 6, and has access points 151 and 152 on opposite sides which form interfaces with the lines. The measuring chamber 150 is connected via the access point 151 to the waste channel W1. The other access point 152 is connected similarly to the waste line W2. The waste lines are in contact with the surroundings via valves. The flow direction in the fluidic system is established by switching the valves. The valves have a particular function when they are only air-permeable and therefore prevent contact of the surroundings with the reagents and the measuring sample.

The following method sequence is then provided: the sample is delivered into the measuring chamber 150 via an external pump assigned to the cartridge 100, any existing air cushion being displaced in front of the liquid. Since the volume of the measuring sample is greater than that of the measuring chamber, delivery of the air cushion and the measuring sample takes place via the access point 151 or 152 into the waste line W1 or W2, respectively.

A first reagent R1 is subsequently delivered, so that the air cushion is sent into the waste channels W1 or W2 without entering the measuring chamber 150. This process will also be referred to as air discharge. The effect achieved by switching the aforementioned valves is that the reagent subsequently flows through the measuring chamber 150.

The same process is carried out for supplying the second reagent R2.

It is therefore possible for sample liquid and reagent liquids, which are contained in different lines that lead to the measuring chamber and are separated from one another and from the measuring chamber by air, to be brought free from air bubbles into the chamber so that the actual measurement in the measuring chamber is not perturbed.

In FIG. 6, the arrangement according to FIG. 5 is modified to the extent that the sample line 161 and the lines 162 and 162', for the reagents are arranged on opposite sides of the measuring chamber 150. In other regards, the arrangement corresponds to the arrangement according to FIG. 1.

With the described method and the arrangement represented in FIG. 1 and FIG. 5 or 6, the required air discharge process can be carried out. Furthermore, the arrangement makes it possible to deliver liquids through the measuring chamber in two directions (pumping forward and back) without the generation of a negative pressure (suction). Binding processes, which take place inside the measuring chamber, are thereby improved.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for bringing at least one reagent, in liquid form and supplied for an electrochemical measurement on a measuring sample in a measuring chamber accessible via lines, for interaction with the measuring sample, the method comprising:

pumping the measuring sample through an access point into the measuring chamber and bringing an excess of the measuring sample into a first waste line located on an opposite side of the measuring chamber from the access point;

delivering the at least one reagent from a line, initially without flowing through the measuring chamber, into a second waste line on a same side of the measuring chamber as the access point;

bringing the at least one reagent, free from air bubbles, to the measuring chamber for interaction with the measuring sample; and performing electrochemical measurement.

2. The method as claimed in claim 1, wherein the measuring sample and the at least one reagent are supplied to the measuring chamber through different access points.

3. The method as claimed in claim 1, wherein the measuring sample and an air cushion in front of at least one reagent are delivered into different waste channels.

4. The method as claimed in claim 1, wherein there is no air in the measuring chamber after the measuring sample and the reagents have been delivered to the measuring chamber.

5. The method as claimed in claim 1, wherein the at least one reagent includes two reagents.

6. The method as claimed in claim 1, wherein the liquid of the at least one reagent is produced "in situ" by dissolving at least one solid pre-dosed and pre-portioned dry reagent by supplying a solvent.

7. The method as claimed in claim 6, wherein water is used as the solvent.

8. The method as claimed in claim 1, further comprising providing a cartridge with a PCR chamber and at least one of label-enzyme- and enzyme-substrate reagent lines, wherein the electrochemical measuring includes performing an application for enzyme-linked DNA hybridization detection with prior PCR.

9. The method as claimed in claim 8, wherein reagent lines are filled with water during the PCR.

10. The method as claimed in claim 8, wherein air is discharged from the at least one of label-enzyme- and enzyme-substrate reagent lines after hybridization, so that the measuring chamber is subsequently flushed initially with a first reagent without an air cushion and subsequently with a second reagent without an air cushion, and wherein the electrochemical measurement is subsequently carried out.

11. The method as claimed in claim 2, wherein the measuring sample and an air cushion in front of the at least one reagent are delivered into different waste channels.

12. The method as claimed in claim 2, wherein there is no air in the measuring chamber after the measuring sample and the reagents have been delivered through the measuring chamber.

13. The method as claimed in claim 2, wherein the at least one reagent includes two reagents.

14. The method as claimed in claim 5, wherein liquids of the two reagents are produced "in situ" by dissolving solid pre-dosed and pre-portioned dry reagents by supplying a solvent.

15. The method as claimed in claim 14, wherein water is used as the solvent.

* * * * *